Patented Oct. 19, 1937

2,096,296

UNITED STATES PATENT OFFICE 2,096,296

PROCESS FOR THE PRODUCTION OF SLIPPERY RUBBER GOODS

Julius Fromm, Berlin-Schlachtensee, Germany

No Drawing. Application April 1, 1936, Serial No. 72,220. In Germany December 7, 1934

3 Claims. (Cl. 18—50)

It is known to make rubber goods such as sheaths, catheters, preventives and the like slide easily by treating them with quickly swelling substances such as Tragasol, Indian tragacanth, locust bean meal, and the like, in a finely divided state. A slight amount of moisture suffices to cause these substances to swell up and to make the surface of the rubber slippery so as to produce the desired smooth-sliding effect.

The use of these materials has, however, the disadvantage that they easily cause the surfaces of the rubber article in question to stick together which, for example, in the case of sheaths, makes them difficult and in some circumstances impossible to roll up.

It has now been found that these undesirable properties of the rapidly swelling substances, from slight moisture can be rendered harmless by using them not alone but in combination with finely powdered substances such as talc, mica, face powder, and the like, which are not influenced by moisture.

The substance having the property of swelling can be distributed over the surface of the powder, or the rubber goods may be dusted with a mixture of this powder and the finely divided swelling material.

Either treatment succeeds in maintaining undiminished the increased slipperiness of the rubber goods produced by using the readily swelling material, while either completely eliminating the increased tendency to stick caused by the slippery substance, or so far reducing this tendency that it no longer interferes with the practical use of the rubber goods.

It has, moreover, been shown that in many cases it is sufficient to provide only the tip of the sheath or preventive with the new powder in order to produce the desired slipperiness and to be able to roll the article on and off without inconvenient sticking.

I claim:—

1. A process for the production of very slippery rubber goods such as finger stalls, catheters or the like by treatment with rapidly swelling substances caused by slight moisture and of the tragacanth type, which consists in applying to the rubber surface said substances combined with fine powders which are not influenced by moisture and selected from a group consisting of talc, mica, face powder and the like.

2. Process for the production of very slippery rubber goods such as sheaths, catheters, and the like for rectal and vaginal use, by treatment with substances rapidly swelling from slight moisture and of tragacanth type, characterized in that the rapidly swelling substances in slightly moist condition are applied to the rubber surface with fine powders which are not influenced by moisture and selected from a group consisting of talc, mica, face powder and the like.

3. Process according to claim 2 characterized in that the rapidly swelling substances are mixed before applying to the rubber surface with said finely divided powder which are not influenced by moisture.

JULIUS FROMM.